United States Patent
Lee et al.

(10) Patent No.: US 11,770,626 B2
(45) Date of Patent: Sep. 26, 2023

(54) CAMERA MODULE AND SUPER RESOLUTION IMAGE PROCESSING METHOD THEREOF

(71) Applicant: LG INNOTEK CO., LTD., Seoul (KR)

(72) Inventors: Chang Hyuck Lee, Seoul (KR); Dae Geun Kim, Seoul (KR); Seok Hyen Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 17/821,350

(22) Filed: Aug. 22, 2022

(65) Prior Publication Data

US 2022/0408018 A1  Dec. 22, 2022

Related U.S. Application Data

(63) Continuation of application No. 16/971,907, filed as application No. PCT/KR2019/002163 on Feb. 21, 2019, now Pat. No. 11,425,303.

(30) Foreign Application Priority Data

Feb. 23, 2018 (KR) .................. 10-2018-0022121

(51) Int. Cl.
*H04N 23/45* (2023.01)
*G06T 3/40* (2006.01)
*H04N 23/951* (2023.01)

(52) U.S. Cl.
CPC ......... *H04N 23/951* (2023.01); *G06T 3/4053* (2013.01); *H04N 23/45* (2023.01)

(58) Field of Classification Search
CPC .. H04N 5/23232; H04N 5/2258; H04N 5/349; H04N 5/2254; G06T 3/4053; G06T 7/521; G06T 7/55
See application file for complete search history.

(56) References Cited

U.S. PATENT DOCUMENTS 9,683,834 B2  6/2017  Hsin et al.
10,609,355 B2  3/2020  Chen et al.
(Continued)

FOREIGN PATENT DOCUMENTS

CN  104982034 A  10/2015
CN  105578071 A  5/2016
(Continued)

OTHER PUBLICATIONS

Notice of Allowance dated Aug. 3, 2022 in Chinese Application No. 201980028015.X.
(Continued)

*Primary Examiner* — Hung H Lam
(74) *Attorney, Agent, or Firm* — Saliwanchik, Lloyd & Eisenschenk

(57) ABSTRACT

A camera module includes an image acquisition unit configured to acquire a plurality of image frames having a spatial phase difference therebetween, an image generation unit configured to generate image data having a resolution higher than a resolution of each of the plurality of image frames using the plurality of image frames, and a depth information extraction unit configured to extract depth information about an object using the image data.

20 Claims, 10 Drawing Sheets

(56) References Cited

U.S. PATENT DOCUMENTS

| | | |
|---|---|---|
| 2007/0222865 A1 | 9/2007 | Levien et al. |
| 2014/0267617 A1 | 9/2014 | Krig |
| 2015/0022642 A1 | 1/2015 | Appia et al. |
| 2015/0022643 A1* | 1/2015 | Stetson ............... H04N 25/702 |
| | | 348/262 |
| 2015/0098013 A1 | 4/2015 | Gray et al. |
| 2015/0312450 A1* | 10/2015 | Park ....................... H04N 23/60 |
| | | 348/335 |
| 2015/0319417 A1* | 11/2015 | Park ......................... G06T 7/593 |
| | | 348/46 |
| 2016/0241840 A1* | 8/2016 | Kim ..................... H04N 13/232 |
| 2016/0261783 A1* | 9/2016 | Elg ........................ H04N 23/73 |

FOREIGN PATENT DOCUMENTS

| | | |
|---|---|---|
| CN | 107079092 A | 8/2017 |
| EP | 2 977 915 A1 | 1/2016 |
| EP | 3 780 596 A1 | 2/2021 |
| JP | 2016-517505 A | 6/2016 |
| KR | 10-2015-0077646 A | 7/2015 |
| KR | 10-2016-0104324 A | 9/2016 |
| KR | 10-2017-0057292 A | 5/2017 |
| WO | 2017/006546 A1 | 1/2017 |
| WO | 2017149092 A2 | 9/2017 |

OTHER PUBLICATIONS

Supplementary European Search Report dated Mar. 15, 2021 in European Application No. 19757781.0.
International Search Report dated Jun. 4, 2019 in International Application No. PCT/KR2019/002163.
Park, S.C. et al., "Super-Resolution Image Reconstruction: A Technical Overview", IEEE Signal Processing Magazine, May 31, 2003, pp. 21-36.
Office Action dated Sep. 22, 2021 in Chinese Application No. 201980028015.X.
Office Action dated Dec. 23, 2021 in U.S. Appl. No. 16/971,907.
Notice of Allowance dated Apr. 7, 2022 in U.S. Appl. No. 16/971,907.
Office Action dated Feb. 7, 2023 in Japanese Application No. 2020-544416.

* cited by examiner

FIG. 10(a)
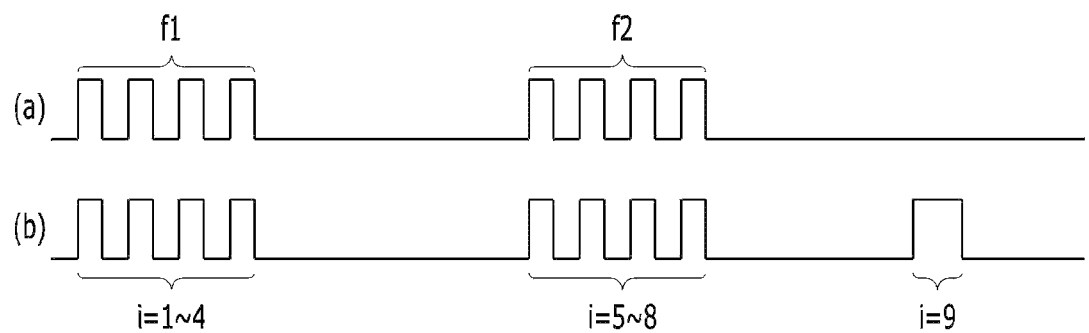
FIG. 10(b)
FIG. 11(a)
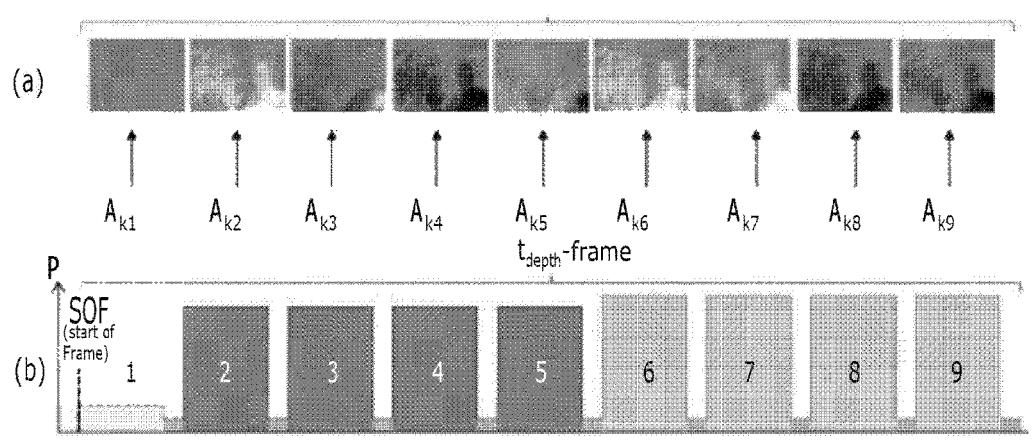
FIG. 11(b)

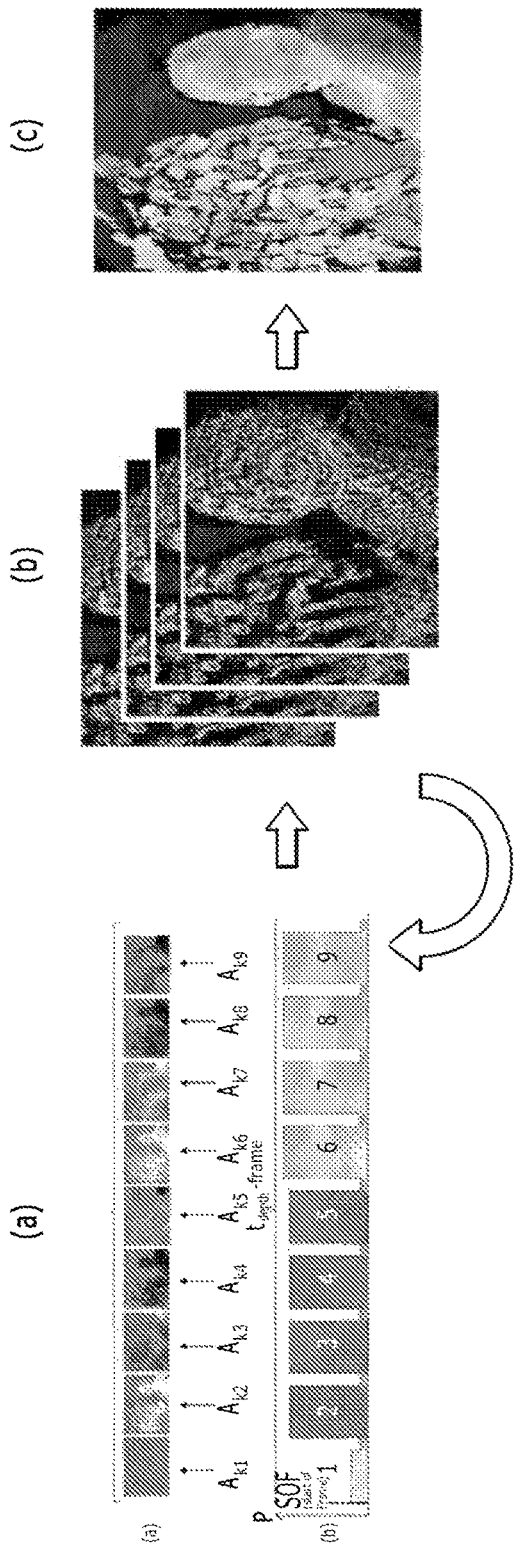

CAMERA MODULE AND SUPER RESOLUTION IMAGE PROCESSING METHOD THEREOF

CROSS-REFERENCE TO RELATED APPLICATIONS

This application is a continuation of U.S. application Ser. No. 16/971,907, filed Aug. 21, 2020; which is the U.S. national stage application of International Patent Application No. PCT/KR2019/002163, filed Feb. 21, 2019, which claims the benefit under 35 U.S.C. § 119 of Korean Patent Application No. 10-2018-0022121, filed Feb. 23, 2018, the disclosures of each of which are incorporated herein by reference in their entirety.

TECHNICAL FIELD

Embodiments relate to a camera module and a super-resolution image processing method thereof.

BACKGROUND ART

People who use portable devices demand optical devices that have high resolution, are small, and have various photographing functions (an optical zoom-in/zoom-out function, an auto-focusing (AF) function, a hand-tremor compensation or optical image stabilizer (OIS) function, etc.). Such photographing functions may be realized by directly moving a plurality of lenses that are combined. In the case in which the number of lenses is increased, however, the size of an optical device may increase.

The auto-focusing and hand-tremor compensation functions are performed by moving or tilting a plurality of lens modules, which are fixed to a lens holder in the state in which the optical axes thereof are aligned, along an optical axis or in a direction perpendicular to the optical axis, and a separate lens moving apparatus is used to move the lens modules. However, the lens moving apparatus has high power consumption, and an additional cover glass needs to be provided separately from the camera module in order to protect the lens moving apparatus, thus leading to an increase in the overall thickness of a device.

Further, with increasing user demand for a high-quality image, a camera module capable of providing a super-resolution image is required. In order to generate a super-resolution image, however, the number of pixels included in an image sensor is inevitably increased, which may result in an increase in the size of the image sensor and increased power consumption. Here, "super resolution (SR)" means conversion of image information having a given low resolution (LR) into image information having a high resolution (HR).

In order to extract the depth of a pixel corresponding to an object included in an image, a time of flight (ToF) method is used as one method of actively extracting a depth by radiating light onto an object. The ToF method is a method of radiating light onto an object and measuring the time taken for the light to return. A point spread function (PSF) for image data is optimized and very simple, whereas a PSF for extracting depth information needs to be newly defined and optimized.

DISCLOSURE

Technical Problem

Embodiments provide a camera module and a super-resolution image processing method thereof capable of simply extracting depth information of a pixel at a high speed while providing a high-resolution image.

The objects to be accomplished by the disclosure are not limited to the above-mentioned objects, and other objects not mentioned herein will be clearly understood by those skilled in the art from the following description.

Technical Solution

A camera module according to an embodiment may include an image acquisition unit configured to acquire a plurality of image frames having a spatial phase difference therebetween, an image generation unit configured to generate image data having a resolution higher than a resolution of each of the plurality of image frames using the plurality of image frames, and a depth information extraction unit configured to extract depth information about an object using the image data.

For example, the image acquisition unit may include an optical unit configured to change a path along which light for an object travels, an image sensor configured to sense light incident along different paths, and a controller configured to control the optical unit and the image sensor. The plurality of image frames may correspond to the results sensed in sequence by the image sensor.

For example, the image acquisition unit may include a plurality of optical units having respectively different paths along which light for an object travels and a plurality of image sensors configured to sense light incident through the plurality of optical units. The plurality of image frames may correspond to the results sensed by the plurality of image sensors.

For example, the image generation unit may generate the image data having an intensity below.

$$x_\phi = \sum_{k=1}^{p}(D^{-1}B_k^{-1}A_k - n_k)$$

Here, $x_\phi$ represents the intensity of the image data, $1 \leq k \leq p$, p represents the number of the image frames used to generate the image data, $\phi$ represents the degree of phase delay, $D^{-1}$ represents the inverse matrix of D, D represents the size of a pixel of the image sensor, $B_K^{-1}$ represents the inverse matrix of $B_K$, $B_K$ represents optical characteristics with respect to the depth information, $n_K$ represents a noise component of a $k^{th}$ image frame among p image frames, and $A_K$ represents the intensity of the $k^{th}$ image frame among p image frames, and is as follows.

$$A_k = DB_k x_\phi + n_k$$

For example, the depth information extraction unit may calculate the depth information as follows.

$$x = \tan^{-1}\frac{x_{\phi 1} - x_{\phi 3}}{x_{\phi 2} - x_{\phi 3}} \times \frac{c}{4\pi f}$$

Here, x represents depth information, c represents a luminous flux, and f represents a frequency.

A super-resolution image processing method of a camera module according to another embodiment may include (a) acquiring a plurality of image frames having a spatial phase difference therebetween, (b) generating image data having a resolution higher than the resolution of each of the plurality of image frames using the plurality of image frames, and (c) extracting depth information about an object using the image data.

For example, step (a) may include changing a path along which light for an object travels and sensing light incident along different paths in sequence to acquire the plurality of image frames.

For example, step (a) may include sensing light for an object simultaneously in different paths to acquire the plurality of image frames.

For example, step (b) may include obtaining the image data having an intensity below.

$$x_\phi = \sum_{k=1}^{p}(D^{-1}B_k^{-1}A_k - n_k)$$

Here, $x_\phi$ represents the intensity of the image data, $1 \leq k \leq p$, p represents the number of the image frames used to generate the image data, $\phi$ represents the degree of phase delay, $D^{-1}$ represents the inverse matrix of D, D represents the size of a pixel of an image sensor obtaining each of the image frames, $B_K^{-1}$ represents the inverse matrix of $B_K$, $B_K$ represents optical characteristics with respect to the depth information, $n_K$ represents a noise component of a $k^{th}$ image frame among p image frames, and $A_K$ represents the intensity of the $k^{th}$ image frame among the p image frames, and is as follows.

$$A_k = DB_k x_\phi + n_k$$

For example, step (c) may include obtaining the depth information as follows.

$$x = \tan^{-1}\frac{x_{\phi 1} - x_{\phi 3}}{x_{\phi 2} - x_{\phi 3}} \times \frac{c}{4\pi f}$$

Here, x represents depth information, c represents a luminous flux, and f represents a frequency.

For example, the super-resolution image processing method of a camera module may further include calibrating the depth information.

The above aspects of the present disclosure are only a part of the exemplary embodiments of the present disclosure, and various embodiments based on technical features of the present disclosure may be devised and understood by those skilled in the art from the following detailed description of the present disclosure.

Advantageous Effects

According to a camera module and a super-resolution image processing method thereof according to an embodiment of present disclosure, it is possible to simply extract depth information at a high speed using a small amount of computation while providing a super-resolution image.

The effects achievable through the disclosure are not limited to the above-mentioned effects, and other effects not mentioned herein will be clearly understood by those skilled in the art from the following description.

DESCRIPTION OF DRAWINGS

FIGS. 10(a) and (b) are waveform diagrams for helping understanding of the calibration step shown in FIG. 9.

FIG. 11(a) illustrates raw data, and FIG. 11(b) illustrates the intensity of an electric charge sensed and output by an image sensor.

FIGS. 12(a) to (c) are diagrams for explaining a super-resolution image processing method according to a comparative example.

BEST MODE

Figure 1:
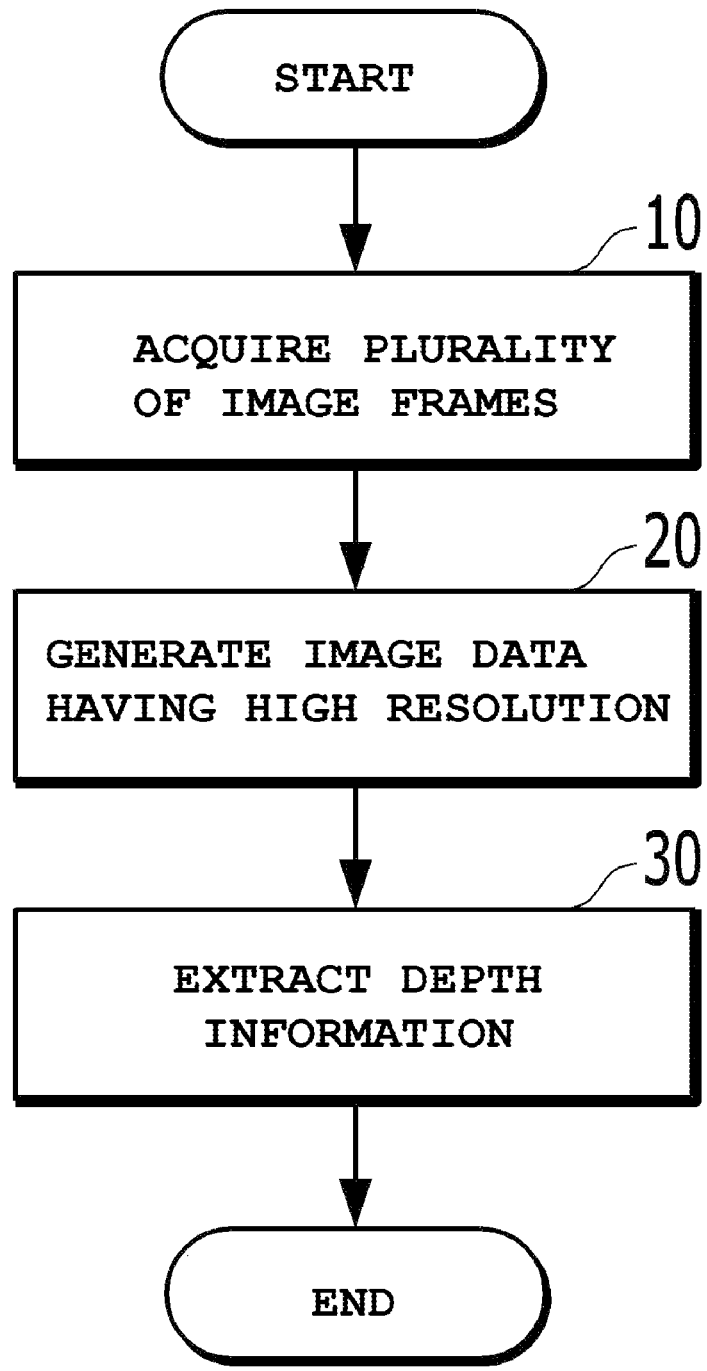
FIG. 1 illustrates a flowchart for explaining a super-resolution image processing method of a camera module according to an embodiment.

Hereinafter, exemplary embodiments will be described in detail with reference to the accompanying drawings. While the disclosure is subject to various modifications and alternative forms, specific embodiments thereof are shown by way of example in the drawings. However, the disclosure should not be construed as being limited to the embodiments set forth herein, but on the contrary, the disclosure is to cover all modifications, equivalents, and alternatives falling within the spirit and scope of the embodiments.

It may be understood that, although the terms "first", "second", etc. may be used herein to describe various elements, these elements are not to be limited by these terms. These terms are generally only used to distinguish one element from another. In addition, terms particularly defined in consideration of the construction and operation of the embodiments are used only to describe the embodiments, but do not define the scope of the embodiments.

In the following description of the embodiments, it will be understood that, when each element is referred to as being "on" or "under" another element, it can be directly on or under another element or can be indirectly formed such that one or more intervening elements are also present. In addition, when an element is referred to as being "on" or "under", "under the element" as well as "on the element" may be included based on the element.

In addition, relational terms, such as "on/upper part/above" and "under/lower part/below", are used only to distinguish between one subject or element and another subject or element without necessarily requiring or involving any physical or logical relationship or sequence between such subjects or elements.

Hereinafter, a super-resolution image processing method of a camera module according to an embodiment will be described with reference to the accompanying drawings.

Figure 2:
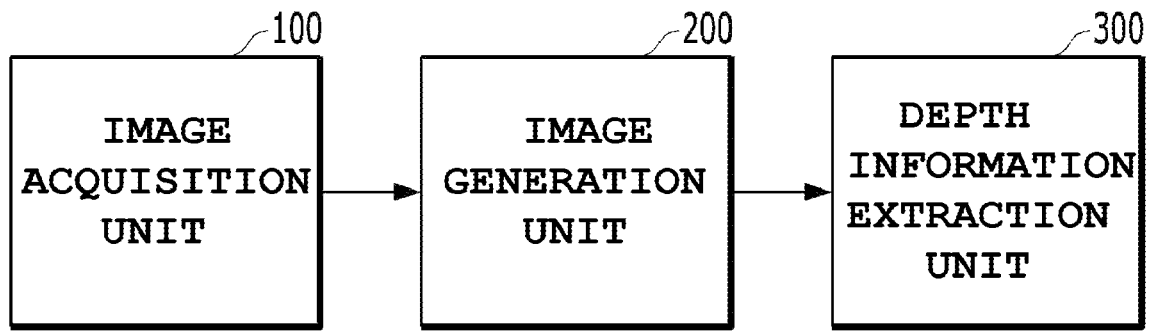
FIG. 2 illustrates a schematic block diagram of a camera module according to an embodiment for performing the super-resolution image processing method shown in FIG. 1.

FIG. 1 illustrates a flowchart for explaining a super-resolution image processing method of a camera module according to an embodiment, and FIG. 2 illustrates a schematic block diagram of a camera module according to an embodiment for performing the super-resolution image processing method shown in FIG. 1.

Although the super-resolution image processing method shown in FIG. 1 will be described as being performed in the camera module shown in FIG. 2, the embodiment is not limited thereto. That is, the super-resolution image processing method shown in FIG. 1 may be performed in a camera module having a configuration different from that of the camera module shown in FIG. 2, and the camera module shown in FIG. 2 may perform a super-resolution image processing method different from that shown in FIG. 1.

The camera module shown in FIG. 2 may include an image acquisition unit 100, an image generation unit 200, and a depth information extraction unit 300.

The image acquisition unit 100 shown in FIG. 2 acquires a plurality of image frames, which have a spatial phase difference corresponding to a subpixel interval therebetween, and outputs the acquired plurality of image frames to the image generation unit 200 (step 10). When the distance between pixels (e.g. the distance between the centers of pixels) is defined as 1 pixel distance (PD), a half thereof corresponds to 0.5 PD. The aforementioned subpixel interval may be 0.5 PD, but the embodiment is not limited thereto.

Figure 3:
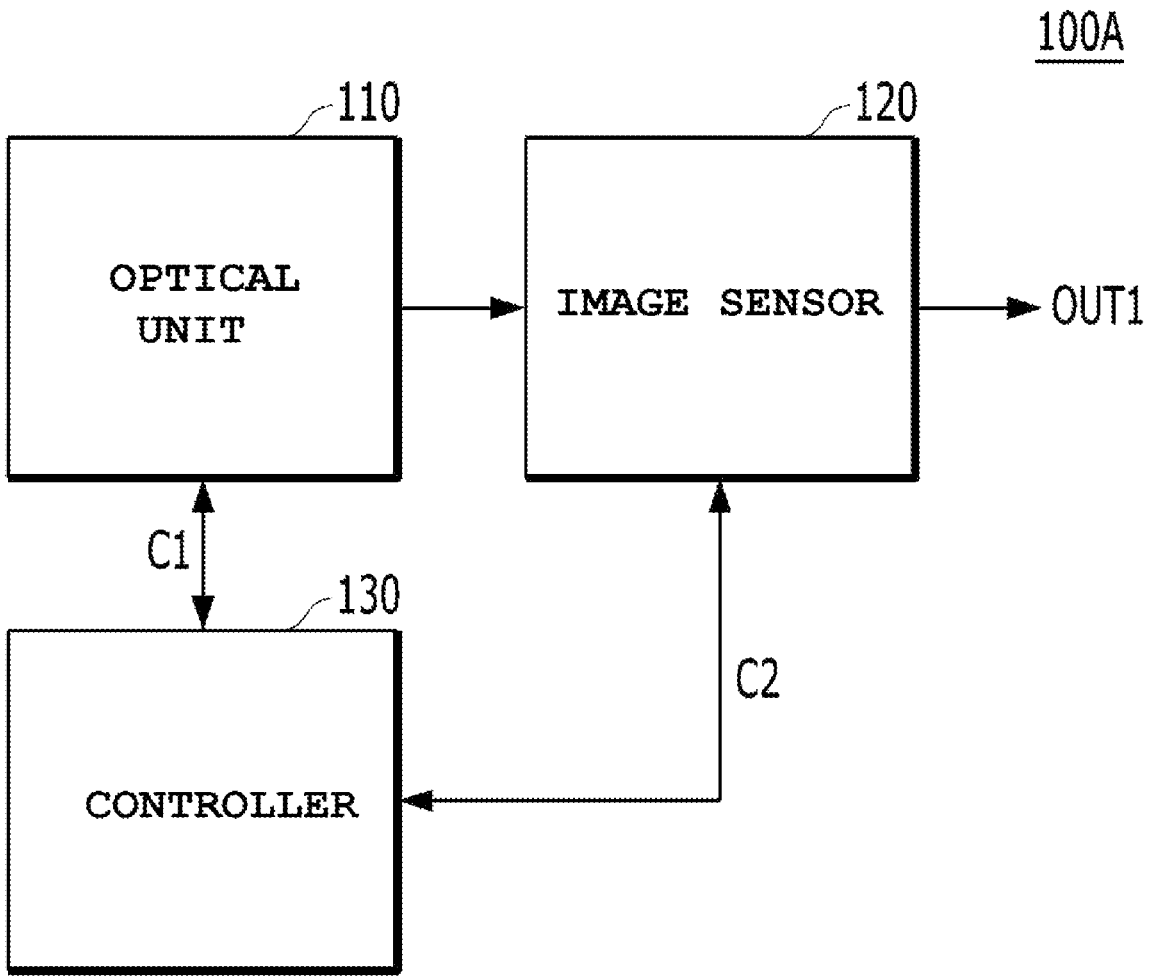
FIG. 3 illustrates a block diagram of an embodiment of the image acquisition unit shown in FIG. 2.

FIG. 3 illustrates a block diagram of an embodiment 100A of the image acquisition unit 100 shown in FIG. 2.

The image acquisition unit 100A shown in FIG. 3 may include an optical unit 110, an image sensor 120, and a controller 130.

The optical unit 110 may change the path along which light for an object travels under the control of the controller 130.

The image sensor 120 may, under the control of the controller 130, sense light beams incident along different paths and output the results of sensing to the image generation unit 200 as image frames through an output terminal OUT1. The image sensor 120 sequentially senses light beams incident along different paths. Accordingly, the results sensed in sequence by the image sensor 120 may correspond to a plurality of image frames having a spatial phase difference therebetween.

The controller 130 may control the optical unit 110 and the image sensor 120. In particular, the controller 130 may change the path along which light travels from the optical unit 110 so that a plurality of image frames, sequentially sensed and output by the image sensor 120, has a spatial phase difference corresponding to a subpixel interval therebetween.

Hereinafter, embodiments of the camera module including the image acquisition unit 100A shown in FIG. 3 will be described using the Cartesian coordinate system. However, other coordinate systems may be used. In the Cartesian coordinate system, an x-axis, a y-axis, and a z-axis are perpendicular to each other, but the embodiments are not limited thereto. That is, the x-axis, the y-axis, and the z-axis may intersect each other obliquely.

Figure 4:
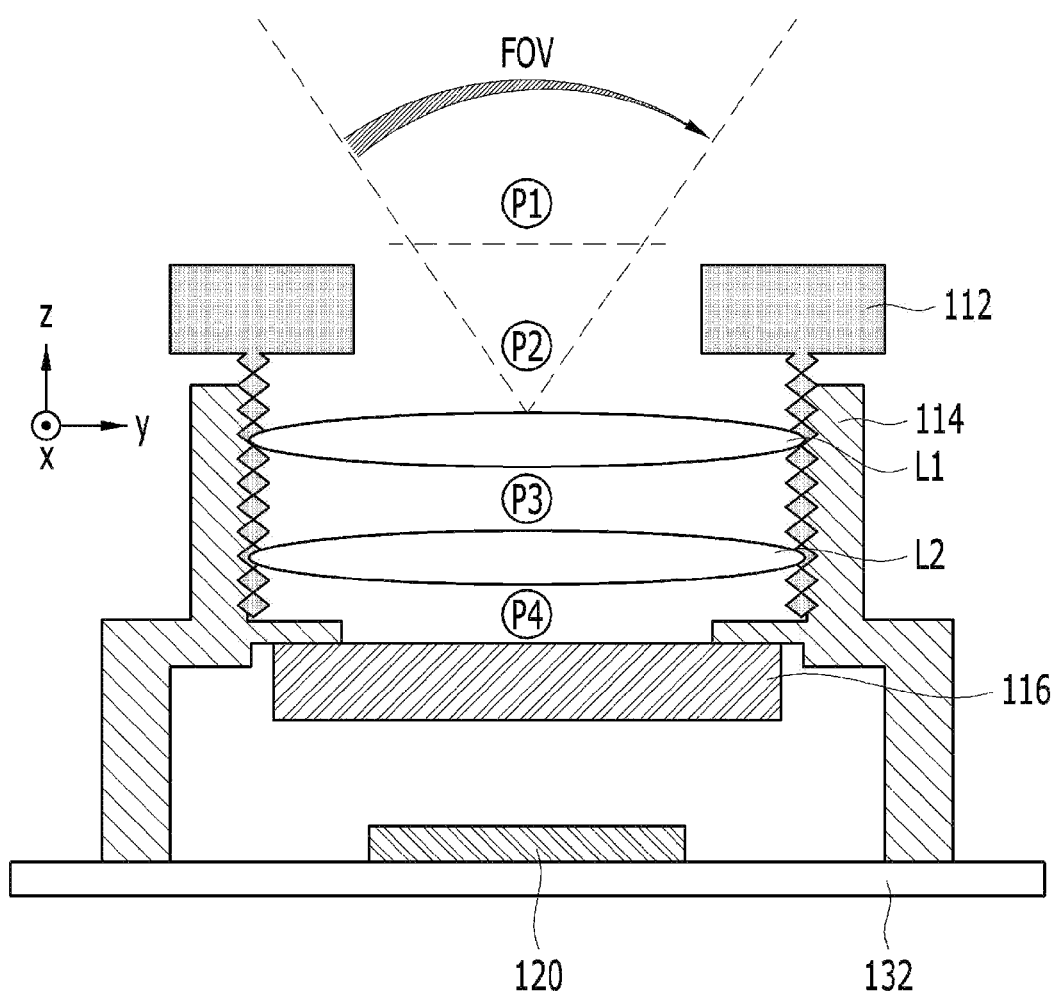
FIG. 4 illustrates a cross-sectional view of an embodiment of the camera module including the image acquisition unit shown in FIG. 3.

FIG. 4 illustrates a cross-sectional view of an embodiment of the camera module including the image acquisition unit 100A shown in FIG. 3.

Referring to FIG. 4, the camera module may include a lens assembly, an image sensor 120, and a main board 132. Here, the lens assembly may correspond to an embodiment of the optical unit 110 shown in FIG. 3, and may include a lens barrel 112, a holder 114, a first lens L1, and a second lens L2. At least one of these components may be omitted, or the vertical arrangement of these components may be changed.

The lens assembly may transmit light incident thereon from the outside of the camera module so that an optical signal is transmitted to the image sensor 120. The lens assembly may include at least one lens. The lenses included in the lens assembly may form one optical system, and may be aligned along the optical axis of the image sensor 120.

The lens barrel 112 may be coupled to the holder 114, and may include a space formed therein to accommodate the first lens L1 and the second lens L2. The lens barrel 112 may be engaged with the first lens L1 and the second lens L2 in a rotational engagement manner, but this is merely exemplary. These components may be engaged in any of other manners, for example, using an adhesive.

The first lens L1 may be disposed in front of the second lens L2. The first lens L1 may be composed of at least one lens, or two or more lenses may be aligned along the central axes thereof to form an optical system. Here, the central axis may be the same as the optical axis of the optical system of the camera module. The first lens L1 may be composed of one lens, as shown in FIG. 4, but the disclosure is not necessarily limited thereto.

The second lens L2 may be disposed behind the first lens L1. Light incident on the first lens L1 from the outside of the camera module may pass through the first lens L1 and may be incident on the second lens L2. The second lens L2 may be composed of at least one lens, or two or more lenses may be aligned along the central axes thereof to form an optical system. Here, the central axis may be the same as the optical axis of the optical system of the camera module. The second lens L2 may be composed of one lens, as shown in FIG. 4, but the disclosure is not necessarily limited thereto.

The first lens L1 and the second lens L2 may be referred to as a 'first solid lens' and a 'second solid lens', respectively, in order to be distinguished from a liquid lens.

In FIG. 4, the lens assembly is illustrated as including two lenses L1 and L2, but the embodiment is not limited thereto. In another embodiment, the lens assembly may include only one lens, or may include three or more lenses.

The holder 114 serves to accommodate and support at least one lens. The holder 114 may be coupled to the lens barrel 112 to support the lens barrel 112, and may be coupled to the main board 132 to which the image sensor 120 is attached.

The holder 114 may have a spiral structure, and may be engaged with the lens barrel 112 having a spiral structure as well in a rotational engagement manner. However, this is merely exemplary. The holder 114 and the lens barrel 112 may be engaged with each other using an adhesive (e.g. an adhesive resin such as epoxy), or the holder 114 and the lens barrel 112 may be integrally formed with each other.

The image sensor 120 corresponds to the image sensor 120 shown in FIG. 3. The image sensor 120 may be mounted on the main board 132, and may include a pixel array configured to receive an optical signal, having passed through the lens assembly, and to convert the optical signal into an electrical signal corresponding thereto, a driving circuit configured to drive a plurality of pixels included in the pixel array, and a readout circuit configured to read an analog pixel signal of each pixel. The readout circuit may compare the analog pixel signal with a reference signal, and may generate a digital pixel signal (or an image signal) through analog-to-digital conversion. Here, the digital pixel signal of each of the pixels included in the pixel array constitutes an image signal, and the image signal may be transmitted in a frame unit and thus may be defined as an image frame. That is, the image sensor may output a plurality of image frames.

The main board 132 may be disposed under the holder 114 and may include wires for transmitting an electrical signal between the respective components together with the controller 130. In addition, a connector (not shown) for realizing electrical connection with a power source or other devices (e.g. an application processor) present outside the camera module may be connected to the main board 132.

The main board 132 may be configured as a rigid flexible printed circuit board (RFPCB) and may be bent depending on the requirements of the space in which the camera module is mounted, but the embodiment is not limited thereto.

In addition, the camera module may further include a filter 116 for transmitting or blocking infrared (IR) light. To this end, the filter 116 may be implemented as a glass. The filter 116 may filter light within a specific wavelength range among light beams that have passed through the second lens L2. The filter 116 may be mounted and fixed in a recess formed in the holder 114. To this end, the holder 114 may include therein a space in which the filter 116 may be attached thereto under the lens barrel 112.

The above-described camera module shown in FIGS. 3 and 4 may change the optical path through various methods.

According to an embodiment, at least one lens included in the lens assembly may include a variable lens. The variable lens may change the optical path of the lens assembly under the control of the controller 130. The variable lens may change the optical path of light incident on the image sensor 120, and may change, for example, the focal length of an optical signal, the angle of a field of view (FOV), or the direction of the FOV. For example, the variable lens may be configured as a liquid lens or a variable prism. The variable lens may be composed of at least one lens and an actuator engaged with the at least one lens. Here, the at least one lens may be a liquid lens or a solid lens. The actuator may control the physical displacement of the at least one lens engaged therewith under the control of the controller 130. That is, the actuator may adjust the distance between the at least one lens and the image sensor 120, or may adjust the angle between the at least one lens and the image sensor 120. Alternatively, the actuator may shift the at least one lens in the x-axis and y-axis directions of the plane formed by the pixel array of the image sensor 120. In addition, the actuator may serve to change the optical path of light incident on the pixel array of the image sensor 120. For example, when a liquid lens is not included in the at least one lens included in the variable lens, that is, when the at least one lens included in the variable lens is a solid lens, the actuator may shift the at least one lens in at least one of the vertical direction or the horizontal direction in response to a first control signal C1 output from the controller 130.

The variable lens may be disposed at any one of first to fourth positions P1 to P4. However, this is merely exemplary, and the variable lens may be located elsewhere depending on the presence or absence of the first lens L1, the second lens L2, and the filter 116 or depending on the relative positions thereof. However, the variable lens may be located on the optical path, which is a region through which light incident on the lens assembly passes, and may change the focal length or the FOV angle. The first position P1 is a position corresponding to the outside of the lens barrel 112, and the second position P2 is a position corresponding to a region above the first lens L1 within the lens barrel 112. The third position P3 is a position corresponding to a region between the first lens L1 and the second lens L2 within the lens barrel 112, and the fourth position P4 is a position corresponding to a region below the second lens L2 within the lens barrel 112.

Alternatively, according to another embodiment, the lens barrel 112, the holder 114, or the filter 116 may be shifted upwards/downwards/leftwards/rightwards by the actuator (not shown) under the control of the controller 130, whereby the optical path of light incident on the image sensor 120 may be changed, and for example, the focal length of an optical signal, the angle of a field of view (FOV), or the direction of the FOV may be changed.

Hereinafter, the operation of changing the FOV angle of the optical unit 110 will be described with reference to FIG. 4.

Referring to FIG. 4, the lens assembly may have a specific field of view (FOV). The FOV may refer to a range of incident light within which the image sensor 120 is capable of performing a capture operation through the lens assembly, and may be defined as an FOV angle. The FOV angle of a typical lens assembly may range from 60° to 140°. On the basis of the x-axis and the y-axis defined when the lens assembly is viewed from above (i.e. from the direction perpendicular to the optical axis), the FOV angle may include a first FOV angle Fx and a second FOV angle Fy. The first FOV angle Fx refers to the angle of the FOV that is determined along the x-axis, and the second FOV angle Fy refers to the angle of the FOV that is determined along the y-axis.

A plurality of pixels included in the pixel array of the image sensor 120 may be arranged in the form of an N×M matrix (where each of N and M is an integer of 1 or more). That is, N pixels may be disposed along the x-axis, and M pixels may be disposed along the y-axis. An optical signal incident through the FOV corresponding to the first FOV angle Fx and the second FOV angle Fy is incident on the N×M pixel array.

The optical path of light passing through the lens assembly or the FOV of the lens assembly may be changed by a control signal C1. The control signal C1 may individually change the first FOV angle Fx and the second FOV angle Fy. The changes in the first FOV angle Fx and the second FOV angle Fy according to the control signal C1 are determined by a first angle variation θI_x and a second angle variation θI_y.

The first angle variation θI_x and the second angle variation θI_y may be defined by the following Equation 1 and Equation 2, respectively.

$$\frac{Fx}{N} \times a < \theta I\_x < \frac{Fx}{N} \times b \qquad \text{[Equation 1]}$$

$$\frac{Fy}{M} \times a < \theta I\_y < \frac{Fy}{M} \times b \qquad \text{[Equation 2]}$$

Here, a may have a value greater than 0.1 and less than 0.5, and b may have a value greater than 1 and less than 2. However, the scope of the embodiment is not limited thereto.

In this case, θI_x and θI_y are angle variations with respect to an image generated by the image sensor 120, which are caused by the change in the optical path by the optical unit 110. The actual angle by which the optical unit 110 changes the optical path may be greater or less than the above angle variations.

However, the camera module and the super-resolution image processing method thereof according to the embodiment are not limited to any specific configuration or method in which the optical unit 110 changes the optical path.

Figure 5:
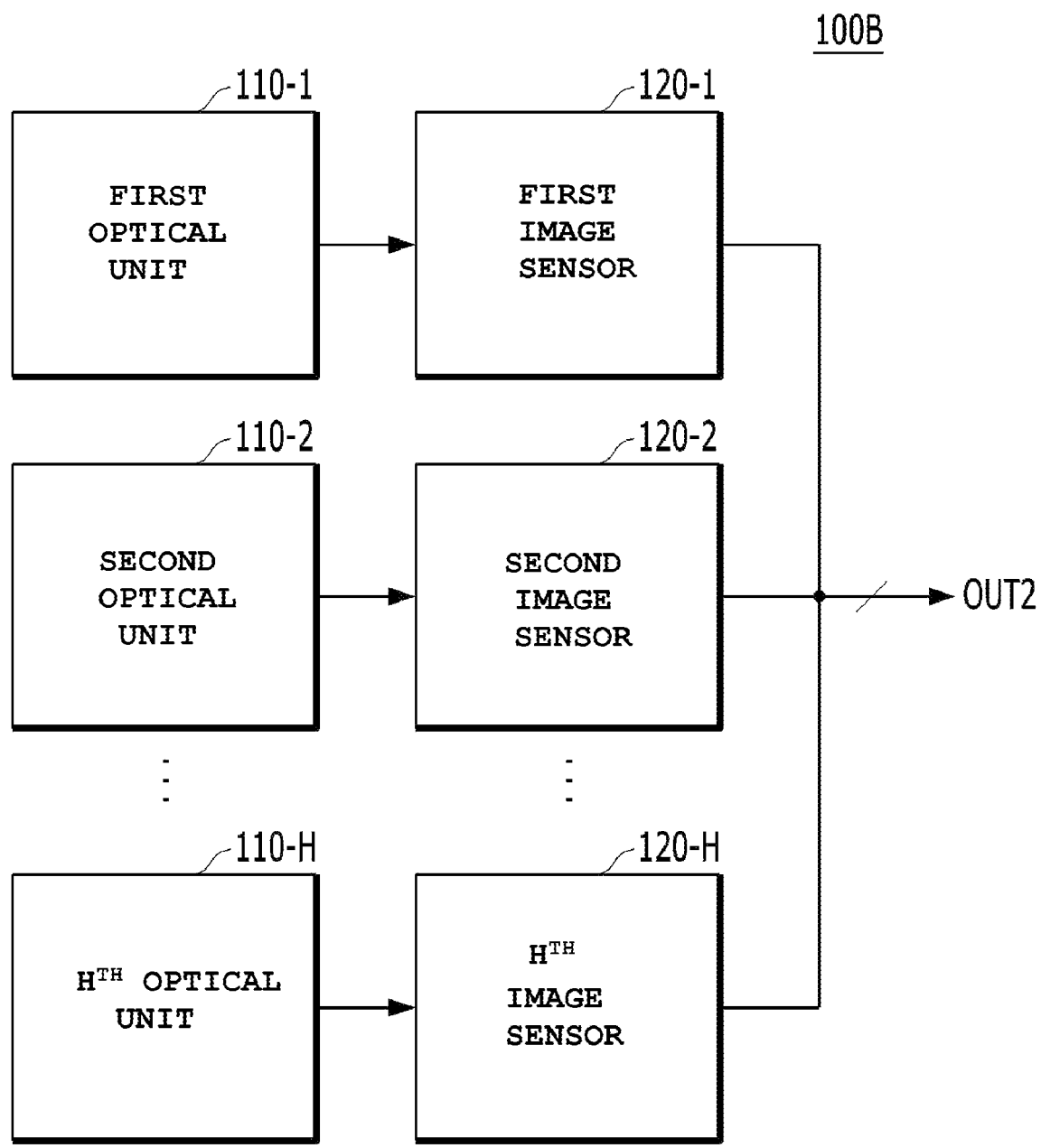
FIG. 5 illustrates a block diagram of another embodiment of the image acquisition unit shown in FIG. 2.

FIG. 5 illustrates a block diagram of another embodiment 100B of the image acquisition unit 100 shown in FIG. 2.

The image acquisition unit 100B shown in FIG. 5 may simultaneously sense light beams for an object along different paths to acquire a plurality of image frames. To this end, the image acquisition unit 100B may include first to $H^{th}$ optical units 110-1 to 110-H and first to $H^{th}$ image sensors 120-1 to 120-H. Here, H is a positive integer of 2 or more.

Each of the first to $H^{th}$ optical units 110-1 to 110-H forms a path along which light for an object travels. In this case, the paths along which light beams travel through the first to $H^{th}$ optical units 110-1 to 110-H are different from each other.

The first to $H^{th}$ image sensors 120-1 to 120-H sense respective light beams incident thereon through the first to $H^{th}$ optical units 110-1 to 110-H, and output the results of sensing to the image generation unit 200 through an output terminal OUT2. The sensing results simultaneously output to the image generation unit 200 through the output terminal OUT2 may correspond to a plurality of image frames having a spatial phase difference corresponding to a subpixel interval therebetween.

After step 10, the image generation unit 200 may generate image data having a resolution higher than the resolution of each of the plurality of image frames, acquired by the image acquisition unit 100, using the plurality of image frames acquired by the image acquisition unit 100, and may output the generated result to the depth information extraction unit 300 (step 20).

Hereinafter, step 20 and an embodiment of the image acquisition unit 100 will be described.

Figure 6:
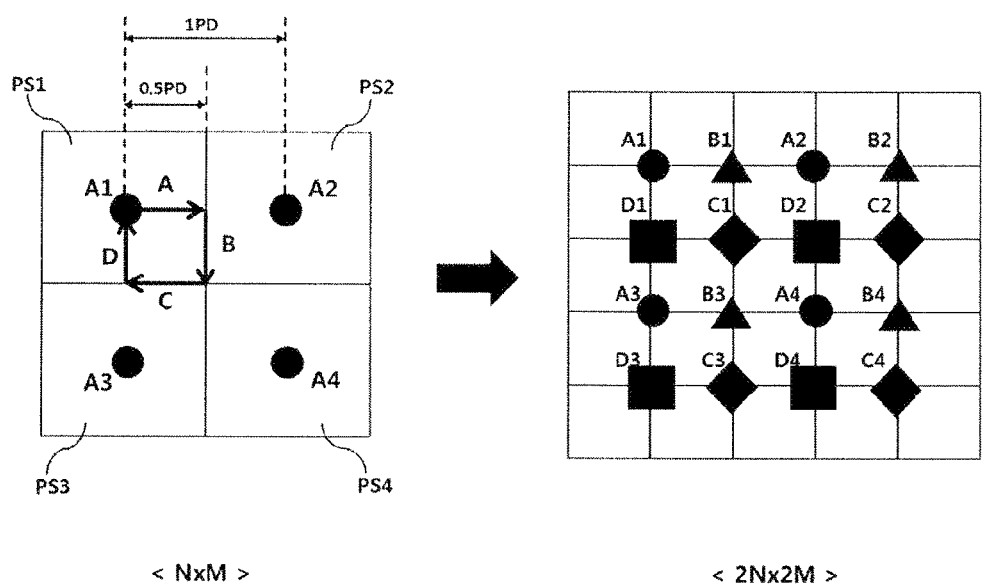
FIG. 6 is a diagram for explaining an operation method of an embodiment of the image acquisition unit.
Figure 7:
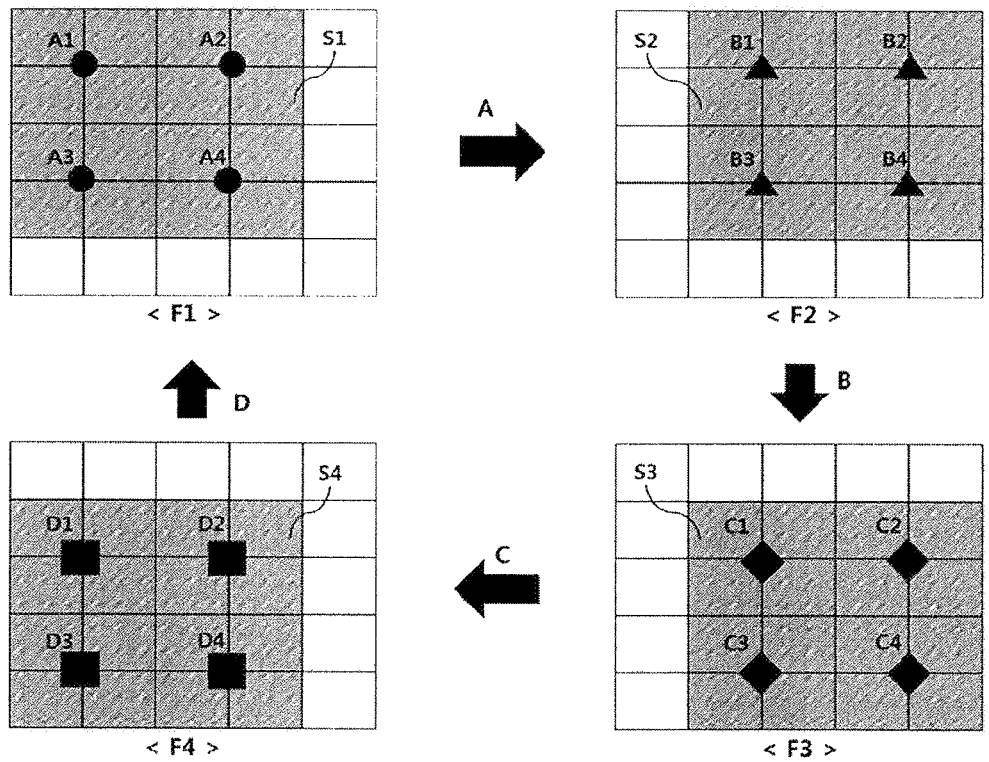
FIG. 7 is a diagram for explaining the operation method of the image acquisition unit explained in FIG. 6 in more detail.

FIG. 6 is a diagram for explaining an operation method of an embodiment of the image acquisition unit 100. FIG. 7 is a diagram for explaining the operation method of the image acquisition unit 100 explained in FIG. 6 in more detail.

FIG. 6 illustrates a mimetic diagram of a method of obtaining a super-resolution image using a plurality of image frames having a spatial phase difference therebetween.

The pixel array of the image sensor 120 (120-1 to 120-H) may include a plurality of pixels arranged in the form of an N×M matrix. For convenience of description, the following description will be made on the assumption that the pixel array includes a plurality of pixels (A1 to A4) arranged in the form of a 2×2 matrix, as shown in FIG. 6.

Each of the pixels A1 to A4 may generate image information (i.e. an analog pixel signal corresponding to the optical signal) about each of pixel scenes PS1 to PS4 using the optical signal transmitted through the lens assembly.

When the distance between pixels adjacent to each other in the x-axis direction (or the y-axis direction) (e.g. the distance between the centers of the pixels) is 1 pixel distance (PD), a half thereof corresponds to 0.5 PD. Hereinafter, first to fourth pixel shifts A to D will be defined.

The first pixel shift A is to shift the respective pixels A1 to A4 by 0.5 PD rightwards in the +x-axis direction, and B1 to B4 denote the pixels after completion of the first pixel shift A.

The second pixel shift B is to shift the respective pixels B1 to B4 by 0.5 PD downwards in the +y-axis direction, and C1 to C4 denote the pixels after completion of the second pixel shift B.

The third pixel shift C is to shift the respective pixels C1 to C4 by 0.5 PD leftwards in the –x-axis direction, and D1 to D4 denote the pixels after completion of the third pixel shift C.

The fourth pixel shift D is to shift the respective pixels D1 to D4 by 0.5 PD upwards in the –y-axis direction, and A1 to A4 denote the pixels after completion of the fourth pixel shift D.

Here, the pixel shift functions not to shift the physical positions of the pixels of the pixel array, but to change the path along which light travels, as shown in FIG. 3, or means an operation in which light travels through the plurality of optical units 110-1 to 110-H having respectively different optical paths, as shown in FIG. 5, so that a virtual pixel (e.g. B1) between two pixels (e.g. A1 and A2) may acquire a pixel scene.

Referring to FIG. 7, the respective pixels A1 to A4 may acquire a pixel scene S1, and the image sensor 120 (120-1 to 120-H) may generate a first frame F1 from pixel signals of the respective pixels A1 to A4.

In response to the control signal C1 for changing the optical path or the FOV rightwards by the first angle variation θI_x in order to realize the first pixel shift A, the optical unit 110 shown in FIG. 3 may change the optical path or the FOV of the lens assembly shown in FIG. 4 rightwards by the first angle variation θI_x, whereby the first pixel shift A may be performed. Alternatively, in order to realize the first pixel shift A, the optical path or the FOV of the first and second optical units 110-1 and 110-2 shown in FIG. 5 may have a difference equivalent to the first angle variation θI_x therebetween. Thereafter, the respective pixels B1 to B4 may acquire a pixel scene S2, and the image sensor 120 (120-1 to 120-H) may generate a second image frame F2 from pixel signals of the respective pixels B1 to B4.

In response to the control signal C1 for changing the optical path or the FOV downwards by the second angle variation θI_y in order to realize the second pixel shift B, the optical unit 110 shown in FIG. 3 may change the optical path or the FOV of the lens assembly shown in FIG. 4 downwards by the second angle variation θI_y, whereby the second pixel shift B may be performed. Alternatively, in order to realize the second pixel shift B, the optical path or the FOV of the second and third optical units 110-2 and 110-3 shown in FIG. 5 may have a difference equivalent to the second angle variation θI_y therebetween. Thereafter, the respective pixels C1 to C4 may acquire a pixel scene S3, and the image sensor 120 (120-1 to 120-H) may generate a third image frame F3 from pixel signals of the respective pixels C1 to C4.

In response to the control signal C1 for changing the optical path or the FOV leftwards by the first angle variation θI_x in order to realize the third pixel shift C, the optical unit 110 shown in FIG. 3 may change the optical path or the FOV of the lens assembly shown in FIG. 4 leftwards by the first angle variation θI_x, whereby the third pixel shift C may be performed. Alternatively, in order to realize the third pixel shift C, the optical path or the FOV of the third and fourth optical units 110-3 and 110-4 shown in FIG. 5 may have a difference equivalent to the second angle variation θI_x therebetween. Thereafter, the respective pixels D1 to D4 may acquire a pixel scene S4, and the image sensor 120 (120-1 to 120-H) may generate a fourth image frame F4 from pixel signals of the respective pixels D1 to D4.

In response to the control signal C1 for changing the optical path or the FOV upwards by the second angle variation θI_y in order to realize the fourth pixel shift D, the optical unit 110 shown in FIG. 3 may change the optical path or the FOV of the lens assembly shown in FIG. 4 upwards by the second angle variation θI_y, whereby the fourth pixel shift D may be performed. Alternatively, in order to realize the fourth pixel shift D, the optical path or the FOV of the fourth and first optical units 110-4 and 110-1 shown in FIG. 5 may have a difference equivalent to the second angle variation θI_y therebetween. Thereafter, the respective pixels A1 to A4 may acquire a pixel scene S1, and the image sensor 120 (120-1 to 120-H) may generate a fifth image frame F5 from pixel signals of the respective pixels A1 to A4. Subsequently, the pixel shift and the generation of the frame through the shifted pixels may be repeatedly performed.

Here, each of the first angle variation θI_x and the second angle variation θI_y may store information related to the extent to which the optical path is changed so that the pixels are shifted by 0.5 PD, and may be calculated in advance based on the first FOV angle Fx and the second FOV angle Fy and may be stored (e.g. by the image sensor 120 or the controller 130).

The image sensor 120 shown in FIG. 3 may include a first region and a second region, and the controller 130 may output the control signal C1 to control the optical unit 110 such that the optical path of light, which is incident from the outside and passes through the lens assembly, is changed from the first region to the second region of the image sensor 120. In addition, the image sensor 120 may further include a third region and a fourth region, and the controller 130 may output the control signal C1 to control the optical unit 110 such that the optical path is changed from the second region to the third region of the image sensor 120, and may output the control signal C1 to control the optical unit 110 such that the optical path is changed from the third region to the fourth region. The control signal C1 may include a signal for changing the field of view (FOV) of the lens assembly in a first direction, a signal for changing the FOV of the lens assembly in a second direction, a signal for changing the FOV of the lens assembly in a third direction, and a signal for changing the FOV of the lens assembly in a fourth direction.

The image generation unit 200 may synthesize the first to fourth image frames and may generate an image acquired by a 2N×2M pixel array rather than by an N×M pixel array. As a method in which the image generation unit 200 synthesizes the first to fourth image frames, a method of simply merging the first to fourth image frames according to the positions of the respective pixels (e.g. in the case of the first row, generating one frame by arranging the pixel signal of A1, the pixel signal of B1, the pixel signal of A2, and the pixel signal of B2) or a method of correcting the pixel signal of any one pixel (e.g. C1) using the pixel signals of the pixels adjacent thereto (e.g. A1, B1, A2, D1, D2, A3, B3, and A4) based on the principle in which the pixel scenes of adjacent pixels overlap each other may be used. However, the scope of the embodiment is not limited thereto. Any of various super-resolution image generation methods may be used.

The image generation unit 200 may be referred to as a postprocessor. The postprocessor may generate a first super-resolution image frame by synthesizing some of the plurality of image frames transmitted from the image sensor 120 (120-1 to 120-H), and may then generate a second super-resolution image frame by synthesizing the remaining ones of the plurality of image frames output from the image sensor 120 (120-1 to 120-H).

According to the processing shown in FIGS. 6 and 7, an image having a quadruple resolution may be generated by synthesizing a plurality of image frames acquired through pixel shift.

Figure 8:
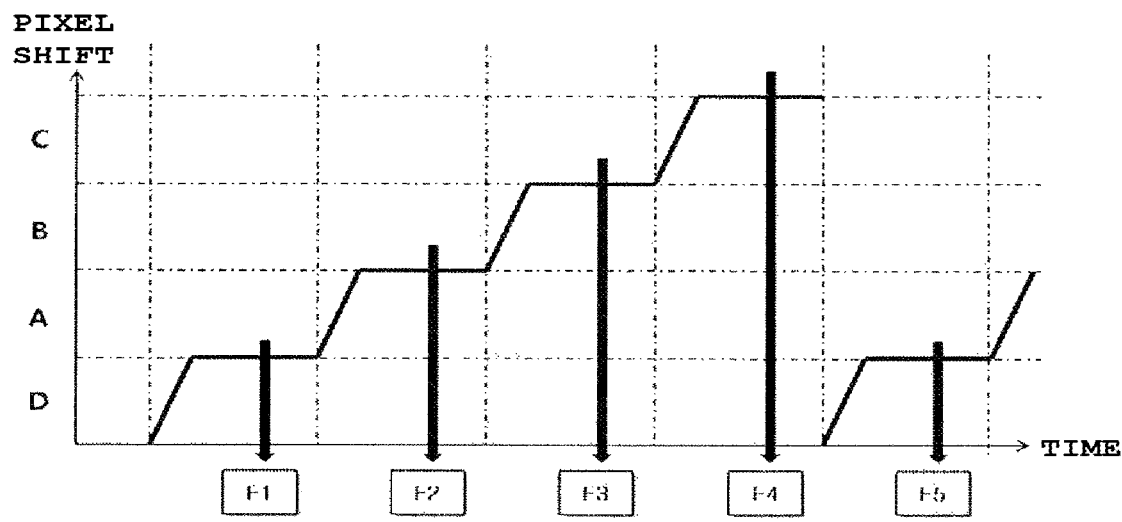
FIG. 8 is a timing diagram of the operation method of the camera module according to an embodiment.

FIG. 8 is a timing diagram of the operation method of the camera module according to an embodiment.

Referring to FIG. 8, the controller 130 may transmit a feedback signal, which indicates that the fourth pixel shift D has been completed by the optical unit 110 in response to the control signal C1, to the image sensor 120 as a control signal C2. In this case, the controller 130 may determine the completion of the fourth pixel shift D based on a response signal from the lens assembly or a separate timer. The respective pixels A1 to A4 of the image sensor 120 that receives the feedback signal may acquire the pixel scene S1, and the image sensor 120 may generate the first image frame F1 from the pixel signals of the respective pixels A1 to A4. In the same manner, the second to fifth image frames F2 to F5 may be generated. Subsequently, the pixel shift and the generation of the frame through the shifted pixels may be repeatedly performed.

In particular, the controller 130 may transmit the control signal C1 when generation of the image frame by the image sensor 120 is completed and the image sensor 120 transmits a synchronization signal, which instructs transmission of the control signal C1 to the optical unit 110, thereto as a control signal C2. That is, a series of operations including the pixel shift, the generation of the frame, and the subsequent pixel shift may be performed through transmission and reception of the control signals C1 and C2 and synchronization thereof.

According to an embodiment, the image generation unit 200 may generate super-resolution image data having a high resolution, which has an intensity expressed using the following Equation 3 using the plurality of image frames acquired as described above.

$$x_\phi = \sum_{k=1}^{p}(D^{-1}B_k^{-1}A_k - n_k) \quad \text{[Equation 3]}$$

Here, $x_\phi$ represents the intensity of the image data generated by the image generation unit 200, $1 \leq k \leq p$, p represents the number of a plurality of image frames having a spatial phase difference therebetween, which are used to generate the image data, p being a positive integer of 2 or more, and $\phi$ represents the degree of phase delay. When each of p image frames includes I subframes, I=9, and p=4, $\phi$ may be expressed using the following Equation 4.

$$\phi = \arctan\left(\frac{Q_3 - Q_4}{Q_1 - Q_2}\right) \quad \text{[Equation 4]}$$

Here, Q represents the intensity of the subframe.

In addition, in Equation 3 above, $D^{-1}$ represents the inverse matrix of D, D represents the size of the pixel of the image sensor 120 (120-1 to 120-H), $B_K^{-1}$ represents the inverse matrix of $B_K$, $B_K$ represents optical characteristics with respect to depth information, $n_K$ represents a noise component of a $k^{th}$ image frame among p image frames, and $A_K$ represents the intensity of the $k^{th}$ image frame among the p image frames. $A_K$ may be expressed using the following Equation 5.

$$A_k = DB_k x_\phi + n_k \quad \text{[Equation 5]}$$

After step 20, the depth information extraction unit 300 extracts depth information about an object using the super-resolution image data generated by the image generation unit 200 (step 30).

According to an embodiment, when I=9 and p=4, the depth information extraction unit 300 may calculate depth information, as expressed in Equation 6 below.

$$x = \tan^{-1} \frac{x_{\phi 1} - x_{\phi 3}}{x_{\phi 2} - x_{\phi 3}} \times \frac{c}{4\pi f} \quad \text{[Equation 6]}$$

Here, x represents depth information, c represents a luminous flux, and f represents a frequency.

In the high-resolution image processing method according to the above-described embodiment, image data having a high resolution is generated through Equation 3 using $A_k$ in Equation 5 above. Thereafter, depth information x is obtained through Equation 6 above using the image data having a high resolution obtained through Equation 3.

In addition, the super-resolution image processing method according to the embodiment may further include a step of calibrating depth information (hereinafter referred to as a 'calibration step'). This calibration step may be performed in step 30 described above, but the embodiment is not limited thereto.

Hereinafter, the calibration step according to the embodiment will be described with reference to FIGS. 9, 10(*a*), and 10(*b*). For convenience of explanation, it is assumed that p=4 and I=9. Here, 1≤i≤I.

Figure 9:
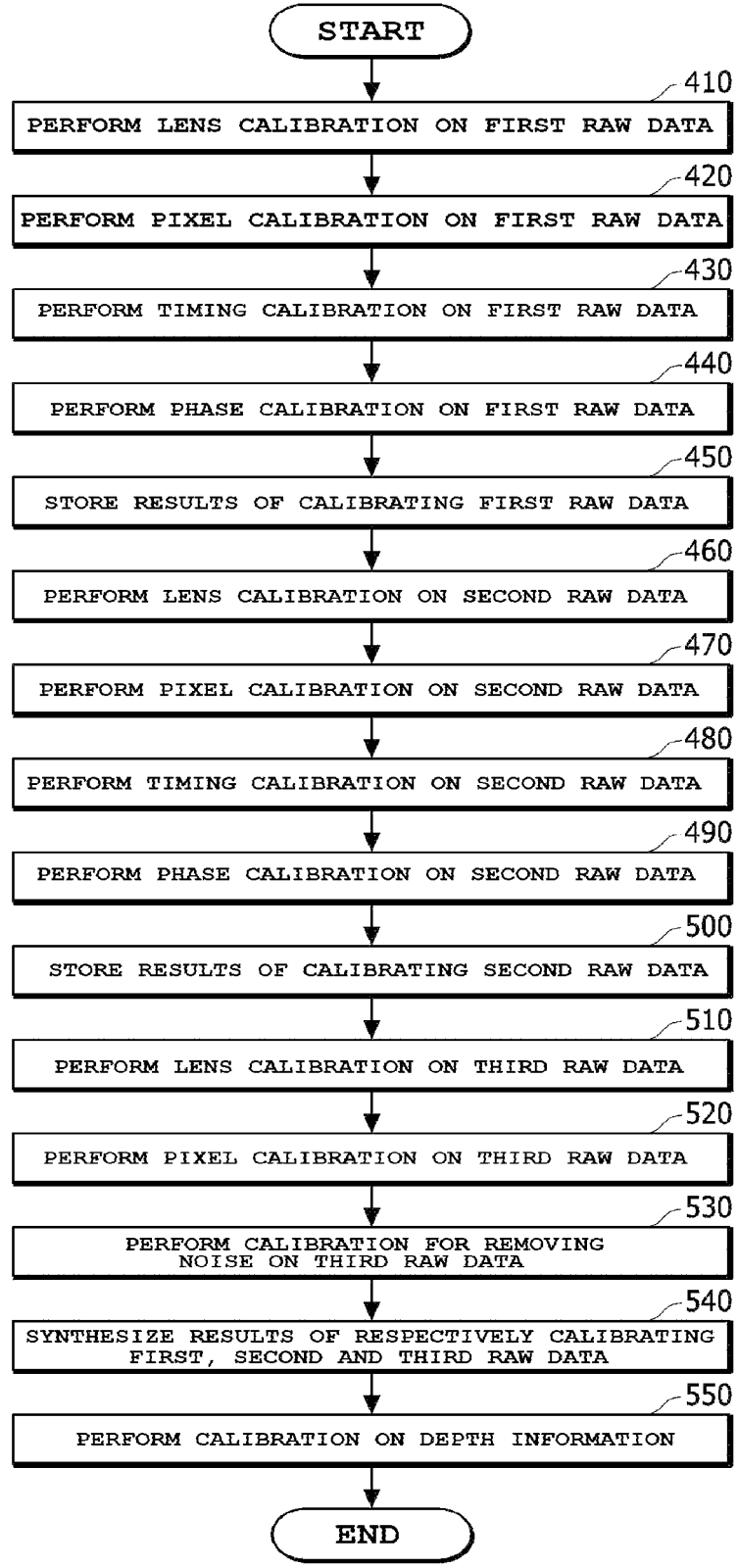
FIG. 9 is a flowchart for explaining an embodiment of a calibration step in the super-resolution image processing method according to the embodiment.

FIG. 9 is a flowchart for explaining an embodiment of the calibration step in the super-resolution image processing method according to the embodiment, and FIGS. 10(*a*) and (*b*) are waveform diagrams for helping understanding of the calibration step shown in FIG. 9. FIG. 10(*a*) illustrates a waveform diagram of an optical signal emitted toward an object, and FIG. 10(*b*) illustrates a waveform diagram of an optical signal received by the image sensor 120 (120-1 to 120-H).

First, lens calibration is performed on first raw data (step 410). Here, the first raw data is data on four left subframes, among I subframes, at a first frequency f1 of a unit image frame, as shown in FIGS. 10(*a*) and (*b*). That is, the subframes from i=1 to i=4 correspond to the first raw data. Lens calibration is an operation of calibrating accurate coordinates with respect to lenses included in the optical unit 110 (110-1 to 110-H).

After step 410 is performed, pixel calibration is performed on the first raw data (step 420). Pixel calibration is an operation of calibrating variation among the respective pixels of the image sensor 120 (120-1 to 120-H).

After step 420 is performed, timing calibration is performed on the first raw data (step 430). Timing calibration is an operation of calibrating variation in the time at which each pixel of the image sensor 120 (120-1 to 120-H) receives a signal.

After step 430 is performed, phase calibration is performed on the first raw data (step 440). Phase calibration is an operation of calibrating variation in the degree of phase delay ϕ in Equation 4, which differs among the respective pixels of the image sensor 120 (120-1 to 120-H).

After step 440 is performed, the results of calibrating the first raw data are stored (step 450).

After step 450 is performed, the above-described lens, pixel, timing, and phase calibrations are also performed on second raw data (steps 460 to 490). Here, the second raw data is data on fifth to eighth subframes from the left, among the I subframes, at a second frequency f2, as shown in FIGS. 10(*a*) and (*b*). That is, the subframes from i=5 to i=8 correspond to the second raw data. The first frequency f1 and the second frequency f2 are different from each other. For example, the first frequency f1 may be 80 MHz, and the second frequency f2 may be 60 MHz, but the embodiment is not limited thereto.

After step 450 is performed, lens calibration is performed on the second raw data (step 460). After step 460 is performed, pixel calibration is performed on the second raw data (step 470). After step 470 is performed, timing calibration is performed on the second raw data (step 480). After step 480 is performed, phase calibration is performed on the second raw data (step 490). After step 490 is performed, the results of calibrating the second raw data are stored (step 500).

After step 500 is performed, the above-described lens and pixel calibrations are also performed on third raw data (steps 510 and 520). Here, the third raw data is data on the rightmost subframe, among the I subframes, as shown in FIGS. 10(*a*) and (*b*). That is, the subframe of i=9 corresponds to the third raw data.

After step 500 is performed, lens calibration is performed on the third raw data (step 510). After step 510 is performed, pixel calibration is performed on the third raw data (step 520). After step 520 is performed, calibration for removing noise is performed on the third raw data (step 530).

After step 530, the results of respectively calibrating the first, second and third raw data are synthesized (step 540). After step 540 is performed, calibration is performed on the depth information (step 550).

The first, second and third raw data described above may be data in the state after basic image signal processing (ISP) has been performed.

According to another embodiment, calibrations may be simultaneously performed on the first to third raw data. That is, while steps 410 to 440 are performed, steps 460 to 490 may be performed, and at the same time, steps 510 to 530 may be performed.

Hereinafter, a super-resolution image processing method according to a comparative example and the super-resolution image processing method according to the embodiment will be described with reference to the accompanying drawings. For convenience of explanation, it is assumed that p=4 and I=9.

FIG. 11(*a*) illustrates raw data, and FIG. 11(*b*) illustrates the intensity of an electric charge sensed and output by the image sensor 120 (120-1 to 120-H).

The raw data shown in FIG. 11(*a*) is data on the $k^{th}$ image frame, among a plurality of image frames having a spatial phase difference therebetween, and the $k^{th}$ image frame has nine (I=9) subframes. Accordingly, $A_{ki}$ represents the intensity of the $i^{th}$ subframe, among the subframes included in the $k^{th}$ image frame.

Referring to FIGS. 11(*a*) and (*b*), $A_{k2}$, $A_{k3}$, $A_{k4}$, and $A_{k5}$ (i=2 to 5) represent an intensity raw data matrix (i.e. an intensity matrix of subframes), which is acquired at a phase gated by first, second, third and fourth angles at the first frequency f1. $A_{k6}$, $A_{k7}$, $A_{k8}$, and $A_{k9}$ represent an intensity raw data matrix, which is acquired at a phase gated by the first, second, third and fourth angles at the second frequency f2. For example, the first, second, third and fourth angles may be 0°, 90°, 180° and 270°, respectively, but the embodiment is not limited thereto.

In FIG. 11(b), the vertical axis represents the number p of electric charges sensed and output by the image sensor 120 (120-1 to 120-H) in each of nine subframes.

According to the super-resolution image processing method according to the comparative example, depth information, which is expressed using the following Equation 7, is generated using the intensity $A_k$ of the frame, which is expressed using Equation 5 above, among a plurality of image frames having a spatial phase difference equivalent to a subpixel interval therebetween.

$$y_k = \tan^{-1} \frac{A_{\phi1} - A_{\phi3}}{A_{\phi2} - A_{\phi3}} \times \frac{c}{4\pi f}$$ [Equation 7]

Here, $y_k$ represents depth information.

Thereafter, image data having a super resolution, which is expressed using the following Equation 8, is generated using $y_k$ in Equation 7.

$$x = M'_k{}^{-1} B'_k{}^{-1} D'^{-1} y_k - n_K$$ [Equation 8]

Here, x corresponds to super-resolution image data, 1≤k≤p, p represents the number of image frames used to generate image data having a super resolution, $M'_k{}^{-1}$ represents the inverse matrix of $M'_k$, $M'_k$ represents a depth point spread function (PSF), which may include blur, $D'^{-1}$ represents the inverse matrix of D', D' represents the size of the pixel of the image sensor, $B'_k{}^{-1}$ represents the inverse matrix of $B'_k$, $B'_k$ represents optical characteristics with respect to depth information, $n_k$ represents a noise component of the plurality of image frames, and $A_k$ may be expressed using Equation 5 above.

FIGS. 12(a) to (c) are diagrams for explaining the super-resolution image processing method according to the comparative example, and FIG. 12(a) illustrates the raw data and the intensity of an electric charge shown in FIGS. 11(a) and (b).

That is, in the case of the comparative example, first depth information $y_1$ about the first (k=1) image frame shown in FIG. 12(a) is obtained as shown in FIG. 12(b) using Equation 7, second depth information $y_2$ about the second (k=2) image frame shown in FIG. 12(a) is obtained as shown in FIG. 12(b) using Equation 7, third depth information $y_3$ about the third (k=3) image frame shown in FIG. 12(a) is obtained as shown in FIG. 12(b) using Equation 7, and fourth depth information $y_4$ about the fourth (k=4) image frame shown in FIG. 12(a) is obtained as shown in FIG. 12(b) using Equation 7.

Thereafter, the first to fourth depth information $y_1$ to $y_4$ may be substituted into Equation 8 to obtain the super-resolution image shown in FIG. 12(c).

The super-resolution image processing method according to the comparative example described above has a problem of an increased amount of computation because the computation process of Equation 7 for converting image information into depth information is performed p times. In addition, even after depth information is extracted, additional modeling needs to be performed on $M'_k$, as expressed in Equation 8. In addition, the optical characteristics (e.g. $B'_k$) with respect to depth information are more complicated than in the case of the image PSF.

On the other hand, in the case of the super-resolution image processing method according to the embodiment, super-resolution image data $x_\phi$ in Equation 3 above is generated using image data in Equation 5 in the middle of the process of extracting distance information x from the image frame through an I-time-of-flight (I-ToF) method.

Thereafter, depth information is extracted using the super-resolution image data $x_\phi$. Therefore, the super-resolution image processing method according to the embodiment is capable of solving a problem with the resolution of I-ToF.

Consequently, like the comparative example, in the case in which image data having a high resolution is obtained after depth information is extracted, the amount of computation increases. The reason for this is that the result of extracting depth information inherently contains supplementary data in addition to high-resolution image data, and thus has a large logic size. On the other hand, in the case of the embodiment, since high-resolution image data having a small logic size is obtained in advance before depth information is extracted, the amount of computation may be reduced.

Figures 13A, 13B, 13C:
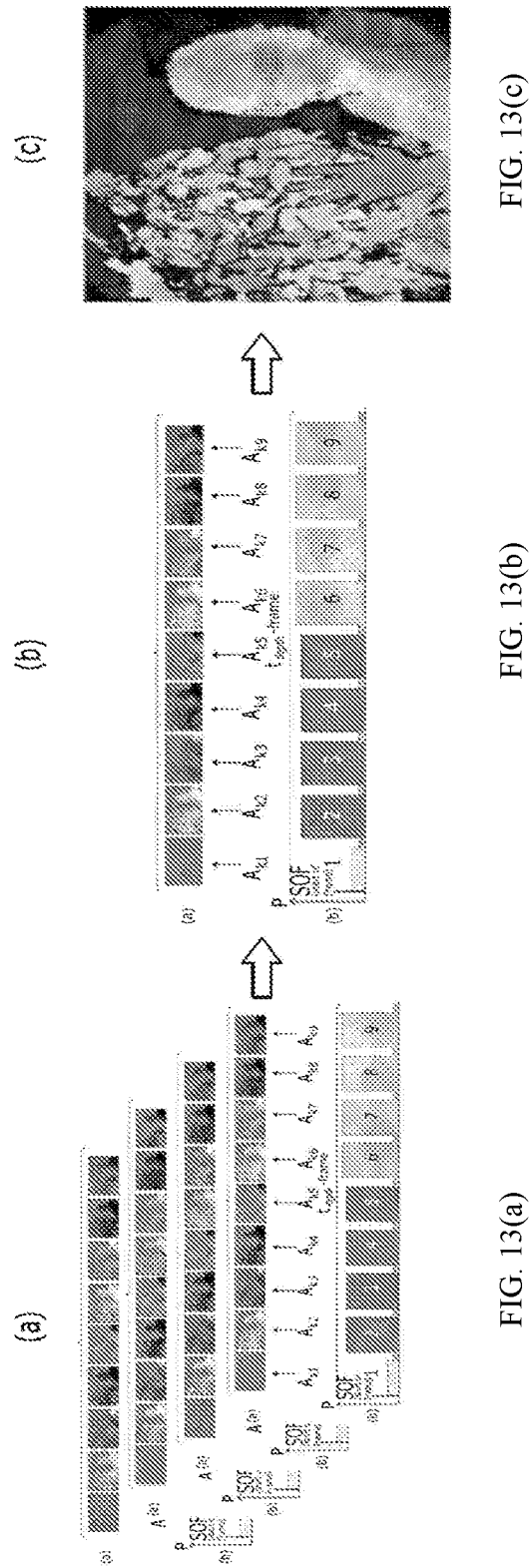
FIGS. 13(a) to (c) are diagrams for explaining the super-resolution image processing method according to the embodiment.

FIGS. 13(a) to (c) are diagrams for explaining the super-resolution image processing method according to the embodiment. FIG. 13(a) illustrates four (P=4) image frames, and each of the four image frames has the same intensity of electric charge as the raw data shown in FIGS. 11(a) and (b).

In the super-resolution image processing method according to the embodiment, super-resolution image data $x_\phi$ shown in FIG. 13(c) is generated by substituting four image frames from the first (k=1) image frame to the fourth (k=4) image frame into Equation 3.

Thereafter, depth information x is extracted by substituting the super-resolution image data $x_\phi$ into Equation 6, and therefore it is not necessary to perform modeling on $M'_k$ in Equation 8, which is a complicated PSF executed on depth data in the comparative example. In addition, the super-resolution image processing method according to the embodiment is capable of decreasing the complexity of an optical PSF for extracting depth information. In addition, in the case of the comparative example, the computation ($\tan^{-1}$) of Equation 7 is repeatedly performed, whereas in the case of the embodiment, the computation ($\tan^{-1}$) of Equation 6 is performed only once. As a result, according to the super-resolution image processing method according to the embodiment, the computation time required for image processing may be shortened, and image processing may be performed at a higher speed with the same configuration.

Although only a limited number of embodiments have been described above, various other embodiments are possible. The technical contents of the above-described embodiments may be combined into various forms as long as they are not incompatible with one another, and thus may be implemented in new embodiments.

For example, an optical device (or an optical instrument) including the above-described camera module may be implemented. Here, the optical device may include a device that may process or analyze optical signals. Examples of the optical device may include camera/video devices, telescopic devices, microscopic devices, an interferometer, a photometer, a polarimeter, a spectrometer, a reflectometer, an autocollimator, and a lens-meter, and the embodiments may be applied to optical devices that may include at least one of a solid lens or a liquid lens. In addition, the optical device may be implemented in a portable device such as, for example, a smartphone, a laptop computer, or a tablet computer. Such an optical device may include a camera module, a display unit configured to output an image, and a body housing in which the camera module and the display unit are mounted. A communication module, which may communicate with other devices, may be mounted in the body housing of the optical device, and the optical device may further include a memory unit capable of storing data.

It will be apparent to those skilled in the art that various changes in form and details may be made without departing from the spirit and essential characteristics of the disclosure set forth herein. Accordingly, the above detailed description is not intended to be construed to limit the disclosure in all aspects and to be considered by way of example. The scope of the disclosure should be determined by reasonable interpretation of the appended claims and all equivalent modifications made without departing from the disclosure should be included in the following claims.

Mode for Invention

Various embodiments have been described in the best mode for carrying out the disclosure.

INDUSTRIAL APPLICABILITY

A camera module and a super-resolution image processing method thereof according to embodiments may be used in camera/video devices, telescopic devices, microscopic devices, an interferometer, a photometer, a polarimeter, a spectrometer, a reflectometer, an auto-collimator, a lensmeter, a smartphone, a laptop computer, a tablet computer, etc.

The invention claimed is:

1. A camera module, comprising:
an image acquisition unit configured to acquire a plurality of image frames having a spatial phase difference therebetween;
an image generation unit configured to generate image data having a resolution higher than a resolution of each of the plurality of image frames using the plurality of image frames; and
a depth information extraction unit configured to extract depth information about an object using the image data,
wherein a logic size of a result of extracting the depth information is greater than a logic size of the image data generated by the image generation unit, the result of extracting the depth information including supplementary data.

2. A camera module, comprising:
an image acquisition unit configured to acquire a plurality of image frames having a spatial phase difference therebetween;
an image generation unit configured to generate image data having a resolution higher than a resolution of each of the plurality of image frames using the plurality of image frames; and
a depth information extraction unit configured to extract depth information about an object using the image data,
wherein the image acquisition unit comprises:
an optical unit configured to change a path along which light for the object travels;
an image sensor configured to sense light incident along different paths; and
a controller configured to control the optical unit and the image sensor,
wherein the plurality of image frames corresponds to results sensed in sequence by the image sensor, and
wherein the image generation unit generates the image data using an intensity obtained below on each of the plurality of image frames:

$$D^{-1}B_k^{-1}A_k - n_k$$

where $1 \leq k \leq p$, p represents a number of the image frames used to generate the image data, $D^{-1}$ represents an inverse matrix of D, D represents a size of a pixel of the image sensor, $B_K^{-1}$ represents an inverse matrix of $B_k$, $B_k$ represents optical characteristics with respect to the depth information, $n_k$ represents a noise component of a $k^{th}$ image frame among p image frames, and $A_k$ represents an intensity of the $k^{th}$ image frame among the p image frames, and is as follows:

$$A_k = DB_k x_\phi + n_k,$$

where $x_\phi$ represents an intensity of the image data and $\phi$ represents a degree of phase delay.

3. The camera module according to claim 2, wherein the image generation unit generates the image data having the intensity as follows:

$$x_\phi = \sum_{k=1}^{p}(D^{-1}B_k^{-1}A_k - n_k).$$

4. The camera module according to claim 2, wherein the depth information extraction unit calculates the depth information as follows:

$$x = \tan^{-1}\frac{x_{\phi 1} - x_{\phi 3}}{x_{\phi 2} - x_{\phi 3}} \times \frac{c}{4\pi f}$$

where x represents depth information, c represents a luminous flux, and f represents a frequency.

5. The camera module according to claim 2, wherein the image acquisition unit comprises:
a plurality of optical units having respectively different paths along which light for the object travels; and
a plurality of image sensors configured to sense light incident through the plurality of optical units, and
wherein the plurality of image frames corresponds to results sensed by the plurality of image sensors.

6. The camera module according to claim 2, wherein the plurality of image frames has a spatial phase difference corresponding to an interval smaller than a pixel interval therebetween.

7. The camera module according to claim 2, wherein the controller changes the path along which light travels from the optical unit so that the plurality of image frames, sequentially sensed and output by the image sensor, has a spatial phase difference corresponding to an interval smaller than a pixel interval therebetween.

8. A super-resolution image processing method of a camera module, comprising:
acquiring a plurality of image frames having a spatial phase difference therebetween; and
extracting of distance information about an object from the plurality of image frames through an I-time-of-flight (I-ToF) method,
wherein image data having a resolution higher than a resolution of each of the plurality of image frames is generated using the plurality of image frames, during a process of extracting the distance information,
wherein the distance information includes a depth information, and
wherein the depth information about the object is extracted using the generated image data.

9. The super-resolution image processing method according to claim 8, wherein the plurality of image frames is synthesized to generate the image data corresponding to an image acquired by a 2N×2M pixel array rather than by an N×M pixel array, an image sensor having the N×M pixel array.

10. A super-resolution image processing method of a camera module, comprising:
(a) acquiring a plurality of image frames having a spatial phase difference therebetween;
(b) generating image data having a resolution higher than a resolution of each of the plurality of image frames using the plurality of image frames; and
(c) extracting depth information about an object using the image data,
wherein step (b) comprises obtaining the image data using an intensity obtained below on each of the plurality of image frames:

$$D^{-1}B_k^{-1}A_k - n_k$$

where $1 \leq k \leq p$, p represents a number of the image frames used to generate the image data, $D^{-1}$ represents an inverse matrix of D, D represents a size of a pixel of an image sensor obtaining each of the image frames, $B_k^{-1}$ represents an inverse matrix of $B_k$, $B_k$ represents optical characteristics with respect to the depth information, $n_k$ represents a noise component of a $k^{th}$ image frame among p image frames, and $A_k$ represents an intensity of the $k^{th}$ image frame among the p image frames, and is as follows:

$$A_k = DB_k x_\phi + n_k$$

wherein $x_\phi$ represents an intensity of the image data and $\phi$ represents a degree of phase delay.

11. The super-resolution image processing method according to claim 10, wherein the intensity of the image data is as follows:

$$x_\phi = \sum_{k=1}^{p}(D^{-1}B_k^{-1}A_k - n_k).$$

12. The super-resolution image processing method according to claim 10, wherein step (c) comprises:
obtaining the depth information as follows:

$$x = \tan^{-1}\frac{x_{\phi 1} - x_{\phi 3}}{x_{\phi 2} - x_{\phi 3}} \times \frac{c}{4\pi f}$$

where x represents depth information, c represents a luminous flux, and f represents a frequency.

13. The super-resolution image processing method according to claim 10, wherein step (a) comprises:
changing a path along which light for the object travels; and
sensing light incident along different paths in sequence to acquire the plurality of image frames.

14. The super-resolution image processing method according to claim 13, wherein the plurality of image frames has a spatial phase difference corresponding to an interval smaller than a pixel interval therebetween, by changing the path along which light travels.

15. The super-resolution image processing method according to claim 10, wherein step (a) comprises:
sensing light for the object simultaneously in different paths to acquire the plurality of image frames.

16. The super-resolution image processing method according to claim 10, comprising performing calibrations on the result of extracting the depth information.

17. The super-resolution image processing method according to claim 16, wherein each of the plurality of image frames includes a plurality of subframes,
wherein the calibrations are performed on each of a plurality of raw data, the plurality of raw data being data on the plurality of subframes, and
wherein the calibrations include at least two of lens calibration, pixel calibration, timing calibration, and phase calibrations.

18. The super-resolution image processing method according to claim 17, wherein the calibrations include a calibration performed on a last raw data for removing noise, the last raw data corresponding to a raw data on which the calibrations are performed last, among the plurality of raw data.

19. The super-resolution image processing method according to claim 18, comprising synthesizing results of respectively calibrating the plurality of raw data after removing the noise.

20. The super-resolution image processing method according to claim 19, wherein the calibrations include a calibration performed on the depth information after performing the synthesizing.

* * * * *